United States Patent [19]

Knaebel

[11] Patent Number: 5,094,755
[45] Date of Patent: Mar. 10, 1992

[54] PURIFICATION OF FLUID MIXTURES BY A THERMAL SWING ADSORPTION RECYCLE SYSTEM

[75] Inventor: Kent S. Knaebel, Plain City, Ohio

[73] Assignee: The Ohio State University Research Foundation, Columbus, Ohio

[21] Appl. No.: 421,149

[22] Filed: Oct. 13, 1989

Related U.S. Application Data

[63] Continuation-in-part of Ser. No. 203,787, Jun. 7, 1988, abandoned.

[51] Int. Cl.[5] ............................................. B01D 15/00
[52] U.S. Cl. .................................... 210/677; 210/690
[58] Field of Search ........ 210/677, 681, 688, 691–694, 210/774, 805, 690

[56] References Cited

U.S. PATENT DOCUMENTS

| | | | |
|---|---|---|---|
| 3,531,401 | 9/1970 | Crits | 210/677 |
| 3,542,525 | 11/1970 | Pigford et al. | 23/311 |
| 4,293,423 | 10/1981 | Kosaka et al. | 210/676 |
| 4,447,329 | 5/1984 | Broughton | 210/677 |
| 4,528,101 | 7/1985 | Burke et al. | 210/656 |
| 4,708,804 | 11/1987 | Coltrinari | 210/677 |

OTHER PUBLICATIONS

Rieke, R. D., "Cycling Zone Adsorption: Variable-Feed Mode of Operation", *Separation Scinece and Technology*, 19 (4 and 5), pp. 261–281, 1984.

Knaebel, K. S. et al., "Equilibrium and Dissipative Effects in Cycling Zone Adsorption", Ind. Eng. Chem. Fundam., vol. 22, No. 3 (1983) pp. 336–346.

Carta et al., "Periodic Countercurrent Operation of Sorption Processes Applied to Water Desalination with Thermally Regenerable Ion-Exchange Resins", paper presented at AIChE meeting (Nov. 1985).

*Primary Examiner*—Ivars Cintins
*Attorney, Agent, or Firm*—Frank H. Foster

[57] ABSTRACT

A continuous cyclic thermal swing adsorption process for the regeneration of a fixed adsorption bed and the purification of an incoming feed liquid stream, with the utilization of at least one product recycle stream, the feed stream comprising a solvent containing at least one dissolved solute, the process comprising contacting a first feed liquid stream maintained at a first temperature, the first feed stream comprising a mixture of a recycled pure, product liquid stream and optionally, at least some of the incoming feed liquid stream, with an at least partially saturated fixed adsorption bed to thereby regenerate the fixed adsorption bed while removing an enriched product liquid stream from the fixed adsorption bed; recycling an effective amount of the enriched product liquid stream having a desired solute concentration to a first storage means; contacting a second feed liquid stream, the second feed stream comprising a mixture of the incoming feed liquid stream and the recycled enriched product liquid stream at second temperature lower than the first temperature, in the fixed adsorption bed to adsorb at least a substantial amount of the at least one dissolved solute, and removing a substantially pure product liquid stream from the fixed adsorption bed exit; recycling an effective amount of the purified product liquid stream having a desired, substantially pure solute concentration to a second storage means for a later regeneration of the fixed adsorption bed.

20 Claims, 3 Drawing Sheets

EFFLUENT CONCENTRATION FROM THE PROCESS.

PURIFICATION OF FLUID MIXTURES BY A THERMAL SWING ADSORPTION RECYCLE SYSTEM

This application is a continuation-in-part application of my copending application Ser. No. 07/203,787, filed June 7, 1988, now abandoned.

FIELD OF THE INVENTION

This invention relates to a thermal swing adsorption process for the purification of a fluid feed stream containing undesired solute therein and the regeneration of the fixed adsorption bed. More particularly, this invention relates to a cyclic thermal swing adsorption process occurring in a fixed adsorption bed where a variety of liquid streams containing solvents and undesired solutes are purified through the utilization of the recycling of both pure and partially impure product stream into the adsorption bed to effect an improved separation process.

DESCRIPTION OF THE PRIOR ART

Parametric pumping and cycling zone adsorption (CZA) are both fixed bed, thermal swing processes which have been developed during the past two decades. During this time, two basic modes of operation of these processes have evolved and are referred to as the direct or standing wave mode, and the recuperative or traveling wave mode. To accomplish the thermal swing in the former, energy is transferred across the adsorption column wall, while in the latter, energy is exchanged via the feed. Thus, only CZA is practical on a large scale, and consequently has been investigated as offering the most promising potential mode of operation. However, it is worthy of note that to date neither of these processes have enjoyed commercial success, due to a number of drawbacks.

Although parametric pumping can achieve large separation factors, it requires unrealistic times to achieve steady state, and therefore is unsuitable for large scale operations. Also, continuous parametric pumping processes typically attain much lower separation factors than their batchwise counter parts. However, the continuous versions do exhibit reasonable solvent recoveries, while their adsorbent productivities are low, but greater than zero. Another problem is that parametric pump separations may reach a peak separation after only a moderate number of cycles, and then the separation characteristics proceed to deteriorate.

Cycling zone absorbers, in contrast to the parametric pumps, frequently achieve greater adsorbent productivities, reasonably high solvent recoveries and short times to reach steady state operation, but still exhibit low separation factors. Consequently, there have been no significant applications to date of thermally driven cyclic adsorption processes, for none of the current systems offer sufficiently high performance to make them industrially effective. Although there was hope for CZA processes involving adsorbent-solute systems, which exhibit a linear isotherm, that adding multiple columns in series might amplify the separation factor in the same manner as repeated cycles in a batchwise parametric pump have, such has not been the case.

Liquid phase cyclic separations have been developed in the past two decades, initially work being done in the field of parametric pumping, while Pigford and others were involved in the area of cycling zone adsorption, such as is set forth in U.S. Pat. No. 3,542,525. Subsequent research has extended the understanding, lead to the development of improved adsorbents, and consequently has produced gradual improvements in performance, but there is still not available an effective commercial system.

The utilization of recycling streams in a variety of separation processes is known, such as set forth in U.S. Pat. Nos. 3,531,401, 4,528,101, 4,293,423 and 4,708,804. In an article by Rieke in Separation Science and Technology, 19(4 & 5) pp. 261-281, (1984) a particular cycling zone adsorption process was disclosed which utilized a cycling zone adsorption column operated with a product recycle. However, the results attained through a significantly different mode of operation were substantially inferior to those of the present invention.

Accordingly, it is an object of the invention to develop a cycling zone adsorption process resulting in economically attractive separations of several classes of mixtures for which suitable adsorbent beds already exist; also, since these adsorbents can be thermally regenerated at levels that correspond to widely available waste heat streams, it is a further object to attain significant benefits in energy conservation and other economics factors. For example, a variety of applications which have stringent separation requirements and can even include other fluids besides liquids, e.g. supercritical fluids and the like, such as, e.g., heavy metals such as cadmium, chromium, and mercury in aqueous solutions, organic solutes such as phenolics which are common in industrial waste waters, or a variety of other mixtures, including aromatic liquids in aliphatic liquids, such as toluene in N-heptane may be suitable for separation. Also, many established and novel adsorbents, including conventional ion exchange resins, polymeric or inorganic adsorbents and thermally sensitive gels may be suitable for a number of diverse applications. Accordingly, it is still another object of the invention that great advances in this promising field can be achieved in the near future.

SUMMARY OF THE INVENTION

In accordance with the invention, there is disclosed a novel, continuous process for a cyclic thermal swing adsorption separation involving the regeneration of a fixed adsorption bed and the purification of an incoming feed fluid stream, e.g., a liquid stream with the utilization of at least one product recycle stream. In the invention's process, the feed stream comprises a solvent containing at least one dissolved solute with the process comprising: contacting a first feed liquid stream maintained at a first temperature, the first feed stream comprising a mixture of a recycled pure, product liquid stream and, in an alternative embodiment optionally at least some of the incoming feed liquid stream, with an at least partially saturated fixed adsorption bed to flow therethrough and thereby regenerate the fixed adsorption bed while removing an enriched product liquid stream from the fixed adsorption bed; and in an embodiment optionally recycling an effective amount of the enriched product liquid stream having a desired solute concentration to a first storage means; then sequentially contacting a second feed liquid stream, the second feed stream comprising the feed liquid stream and, in an alternative embodiment optionally the feed liquid stream mixed with a portion of the recycled enriched product liquid stream, at a second temperature lower than the first temperature, and flowing through the fixed adsorption bed to adsorb at least a substantial amount of the at least one dissolved solute, and removing a substantially pure product liquid stream from the fixed adsorption bed; and recycling an effective amount of the purified product liquid stream having a desired, substantially pure solute concentration, generally to a second storage means, for later regeneration of the fixed adsorption bed.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DESCRIPTION OF THE INVENTION

The invention, in the broadest embodiment, involves two related cycling zone adsorption processes with recycle loops for purifying a liquid feed stream containing undesired solute, e.g., the embodiment chosen to illustrate the invention will be that of a desalinization process although many other solvent-solute single and-/or multiple component fluid systems are equally suitable for illustration. Both of the embodiments are thermal swing cycles which use a fraction of the purified product as a hot regenerant for the fluid adsorbent bed, i.e., a recycle stream. One of the embodiments also uses as an additional recycle stream, that of an intermediate concentration product.

Figure 1:
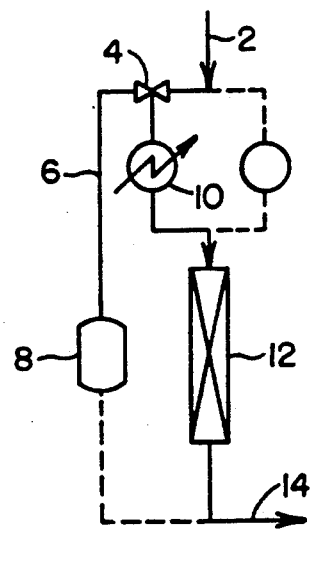
FIGS. 1–4 disclose a schematic diagram for two embodiments of the recycling zone adsorption process.
Figure 2:
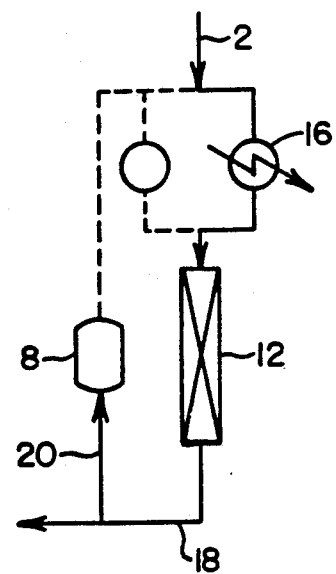
Figure 3:
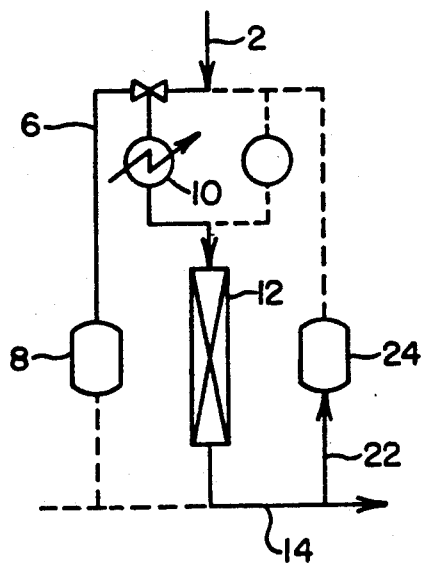
Figure 4:
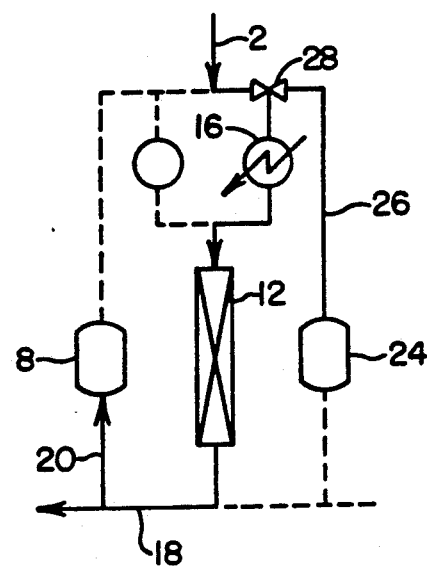

Turning to FIGS. 1 and 2, the process is shown illustrated in the two half cycles (two half cycles equaling one whole cycle and successive whole cycles in sequence comprising a continuous process) shown in those Figures which illustrate the particular embodiment that utilizes only one recycle stream, that of purified product as the hot regenerant. In FIG. 1, an incoming feed stream 2 of salt water containing a specified concentration of dilute salt and other like particles and preferably maintained at a constant temperature flows into the apparatus of the adsorption system and, if desired, is mixed at point 4 with recycle stream 6 comprising substantially pure product liquid, i.e., purified water which has already gone through the adsorption system and has been recycled to a recycle holding tank 8 for usage at the appropriate time. In a second embodiment (not shown) the feed stream entering heating unit 10 is comprised completely of substantially pure recycle in line 6, i.e., there is no mixing of the recycle stream with the incoming feed stream. The recycle stream, which can be processed to almost any desired product concentration depending on such factors as economics and the like, is then mixed with the feed stream at point 4 and is then passed through a heater unit 10 where it is heated to a desired temperature $T_r$ suitable for entering into one end of the adsorption bed 12, the choice of precise temperature being influenced by a number of variables familiar to the skilled artisan. The combined mixed feed incoming stream then flows into the one end of the packed adsorption bed 12 where it contacts and mixes with and passes through a saturated adsorbent bed fabricated from, e.g. a variety of suitable adsorbent units such as ion exchange resins, polymeric adsorbents, inorganic adsorbents or thermally sensitive gels. In the case of salt water, it is preferred to use an ion exchange resin known to one skilled in the art, such as an Amberlite XD-5 ion exchange resin made by Rohm and Haas, Philadelphia, Pa., or a Sirotherm TR-20 resin. In the case of separation of an aromatic from an aliphatic hydrocarbon, useful silica gels are known. However, the particular adsorbent agent used is not a critical element of the invention. The incoming heated regenerant feed stream passes through the saturated packed adsorbent bed from inlet to exit, and removes the adsorbed solute particles present which had been adsorbed during the previous purification run in the apparatus. Next, this enriched product passes out the other end of the adsorbent bed in product stream 14, comprising a liquid having an enriched concentration of solute. This enriched in solute product stream, which is now latent with impurities may either be utilized in a manner not related to the invention or, conceivably, may even be passed back to the original stream to be purified and pass through the apparatus again. Turning to FIG. 2, the cooling half cycle of this process embodiment, which immediately follows the heating half cycle already shown in FIG. 1, is now carried out. This cycle takes place in essentially the same apparatus, except for mixing with a recycle stream and a pass through cooler 16, instead of the heater 10, and the apparatus setup can be effected by the opening and closing of appropriate valves. More particularly, the same liquid feed stream 2 enters into the system and now passes through cooler 16, which cools the incoming feed stream to a desired temperature $T_c$, $T_c$ typically being significantly lower than $T_r$. Note that the incoming feed stream, in this embodiment, is not mixed with any recycle stream but simply passes unimpeded through the cooler mechanism and enters into the adsorbent bed. Inside the bed, which had been cleaned of adsorbed solute, the liquid stream has its solute adsorbed by the ion exchange resin so that the exiting product stream 18 is substantially pure of solute, i.e. typically as pure as is economically feasible, and thus has been essentially purified. It is worthy of mention that the exiting product stream from the absorber bed 12 is not characterized by a uniform concentration curve with respect to the particular amount of solute present, but as one skilled in the art would recognize, is initially treated to the desired level of purity wanted and then as time passes and the bed gradually becomes more saturated, the amount of solute present in the product stream, first gradually and then steeply, rises. As long as the amount of solute in the product stream is kept at or below a certain desired minimum level an effective amount of the purified product stream 18 is taken off in stream 20 and passed, preferably, into recycle holding tank 8 for later use in recycle stream 6 to regenerate the bed in the heating part of the cycle shown in FIG. 1. Turning to FIG. 3, the second and most preferred embodiment of the process is set forth. FIG. 3 shows a similar regeneration cycle as that set forth in FIG. 1, with feed stream 2 being mixed with a pure recycle stream 6, heated to a desired temperature and passed into one end of saturated adsorbent bed 12 to regenerate the bed, then passing out of the other end of the bed as an enriched in solute product stream 14. The solute concentration of the effluent enriched product 14 again falls to a lesser level of solute concentration, which occurs during regeneration of the bed as the enriched product stream 14 gradually becomes more pure as the bed is cleaned of solute. However, when the product effluent reaches this "intermediate" concentration level, an effective amount of the stream is separated, a partially purified stream passes through line 22 into intermediate recycle holding tank 24 to be utilized as a recycled intermediate product regenerated effluent stream in the cooling cycle of the process set forth in FIG. 4. The concentration of this recycled effluent intermediate stream is preferably maintained at about 50 to 200 percent of the concentration of the solute impurities present in the incoming feed stream 2 and the amount of the recycle intermediate stream should preferably range from about 75% to 125% of the amount of the incoming feed liquid stream with which it is mixed. In FIG. 4 is seen a cooling cycle similar to that set forth in the cooling cycle of FIG. 2, with the modification that the incoming liquid feed stream 2 is now mixed with the recycle intermediate stream 26 coming from the intermediate recycle holding tank 24 at point 28 and is then cooled to a desired temperature level in cooler 16 before being purified by entering one end of and passing through adsorbent bed 12 and exiting out the other end of the bed 12 as purified product stream 18. As was the case for the embodiment of FIG. 2, this purified product stream also is divided and a completely purified product stream is taken off and later recycled and the process is continued thereafter as previously set forth.

There are a number of parameters in the adsorption process necessary to optimize when running an efficient process, and these can be accomplished by the skilled artisan. Also, as earlier mentioned, a variety of fluid, as well as liquid solvents, both aqueous and inorganic, are suitable for treatment, and a wide variety of dissolved single and multi-component solute systems found in the solvents can be satisfactorily extracted. The process is particularly suitable for utilization of a wide variety of adsorption beds, and although not essential it is most desirable that the incoming feed streams to the adsorption bed for both purification and regeneration be either preheated or cooled to an optimum temperature. Although the process has been described in terms of a single adsorption bed, in a broad embodiment it is possible to have two or more beds of similar or differing characteristics linked together in series, and the process conducted accordingly Also, the ratio of the mass or volumetric amounts of the one or two recycled stream versus the amount of the product stream can vary considerably, depending upon the amount of purity desired in the final product and other operating conditions, such as the temperatures of the respective streams, and the like. The respective concentrations of the recycled and intermediate recycle purity stream are important, and preferably should be a major factor in optimizing process operation.

Figure 5:
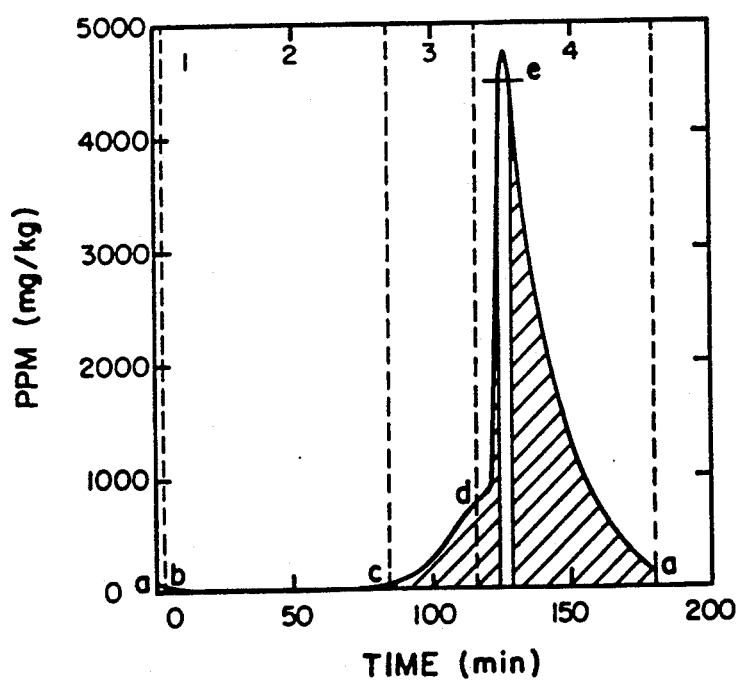
FIG. 5 is a graph of effluent concentration verses time for a complete heating and cooling cycle of a practice of the process.

In FIG. 5, the steps of an actual recycled thermal swing adsorption process are illustrated by one set of actual experimental results for an adsorption bed effluent concentration profile. Note that the steps 1-4 set forth at the top of the figure do not correspond to the idealized diagram shown in FIGS. 1 through 4. Steps 1 to 3 represent the cooling half cycle during which cool feed is supplied, although during step hot effluent from the previous cycle continues to leave the column. Step 2 represents the period during which pure product is obtained, while step 4 is the heating half cycle, during which hot, regenerated pure product is fed to the column inducing regeneration. In the data illustrated herein it was arbitrarily decided to terminate regeneration when the effluent composition reached 100 ppm (point a in FIG. 5). Conversely, the pure solvent product was accepted during step 2 when the concentration was left less than 50 ppm, i.e., from points b to c. The incoming feed was allowed to pass through until the solute effluent reached 75% of the feed concentration (point d) which initiated regeneration Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever In the preceding text in the following examples, all temperatures are set forth uncorrected in degrees celsius and all parts and percentages are by weight; unless otherwise indicated.

EXAMPLES 1-3

Three particular variables are particularly relevant in the comparison of different operating conditions and alternative embodiments. The first is the separation factor, $\alpha$, i.e. the ratio of average product concentrations. The second is the solvent recovery, R, i.e. the fraction of solvent in the feed that is recovered, while the third is the adsorbent productivity, P, i.e. the rate of amount of product processed per unit mass of adsorbent. The particular steps of the process utilized are seen illustrated in the effluent solute concentration profile shown in FIG. 5. Briefly reviewing, steps 1 to 3 numerically set forth at the top of the Figure represent the cooling half cycle during which cool feed is supplied, although during step 1 hot effluent from the previous cycle continues to leave the column. Step 2 represents the period during which pure product is obtained, while step 4 is the heating half cycle, during which hot regenerated pure product is fed to the column inducing regeneration. The process was operated by measuring the effluent concentration at constant temperatures with a flow-through conductivity cell and by switching four solenoid values when predetermined threshold concentrations were reached. As mentioned above, in all of the examples 1-3 it was arbitrarily decided to terminate regeneration when the effluent concentration reached 100 parts per million. Also, the pure solvent product was accepted during step two, i.e., points b to c in FIG. 5, when the concentration was less than 50 parts per million. The feed step was allowed to proceed until the adsorbent bed effluent reached 75% of the feed concentration, which initiated regeneration. These operating conditions were adopted by observing that continuation of the feed step from, as seen in FIG. 5, points c to d allows more complete saturation of the adsorbent, which leads to higher peak concentrations during regeneration, and the associated high separation factor and recovery in the two recycle stream embodiment. The particular characteristics of the adsorbent bed, the ion exchange resin used therein and the bed geometry are set forth below in Table I.

TABLE I

Amberlite XD-5 Ion Exchange Resin

Adsorbent Properties

| | |
|---|---|
| particle diameter = | 0.49 mm |
| particle density = | 1230. kg/m$^3$ |
| intraparticle porosity = | 0.42 |
| Specific Heat of Resin = | 1630. J/kg °K. |

Fixed Bed Characteristics

| | |
|---|---|
| Column Length = | 23.8 cm |
| Cross Section Area = | 3.94 cm$^2$ |
| Adsorbent Mass = | 39.8 g |
| pH = | 5.7 |
| porosity of bed = | 0.405 |

A summary of the results achieved is set forth in Table II. The feed concentration was systematically varied, while the remaining variables were fixed. The adsorbent resin underwent thermal swings ranging from about 26° to 93° C. Minor fluctuations occurred in the feed and regenerant flow rates which were believed to be related to flaws in the peristaltic pump utilized. Also, essentially negligible variations of the temperature extremes occurred. During each example, the products were physically separated in separate reservoirs containing pure product and solute-rich product. At the end of each run the amounts were determined by weighing, and the salt contents were determined with a conductivity bridge and the flow-through cell used in the process experiments. The overall and sodium chloride material balances were varied within 1% in each experiment by this technique.

TABLE II

Conditions and Results

| Variable | 1 | 2 | 3 | Units |
|---|---|---|---|---|
| Solute Concentration, $C_F$, Feed | 500. | 750. | 1000. | ppm |
| $C_P$, Product | 12.4 | 12.8 | 14.7 | ppm |
| $C_{h1}$, High Temp Effluent Single Recycle | 685. | 848. | 1163. | ppm |
| $C_{h2}$, High Temp Effluent Dual Recycle | 2558. | 3658. | 4642. | ppm |
| Temperature, cooling cycle | 28.0 | 26.0 | 30.0 | C°. |
| Temperature, heating cycle | 93.0 | 90.0 | 92.0 | C°. |
| Fluid velocity cooling cycle | 3.68 | 4.93 | 4.29 | cm/min |
| Fluid velocity heating cycle | 8.57 | 3.34 | 4.62 | cm/min |
| Molar Flow Rate, Feed | 36.93 | 36.66 | 36.99 | mol/hr |
| Molar Flow Rate, Product | 10.36 | 3.55 | 5.40 | mol/hr |
| Cycle Time | 4.42 | 3.81 | 3.08 | hr/cycle |
| No. Cycles | 4 | 4 | 5 | |
| Single recycle, $\alpha_1$ | 55.3 | 66.2 | 79.1 | |
| Dual recycle, $\alpha_2$ | 206.3 | 285.8 | 315.8 | |
| Single recycle, $R_1$ | 0.281 | 0.097 | 0.146 | |
| Dual recycle, $R_2$ | 0.808 | 0.798 | 0.787 | |
| Adsorbent Productivity, P | 4.69 | 1.61 | 2.45 | kg/kg hr |

All values are averaged over their respective steps and over the number of cycles listed in the last entry in the Table.

The feed and product molar flow rates, $Q_F$ and $Q_P$ are averaged over the entire cycle. $Q_F$ is the molar flow rate of feed to the process, but it is actually only admitted to the column during the low temperature step. Similarly, $Q_p$ is the net product that is produced only during the low temperature step.

From the above results it can be concluded that in this system the dual recycle process utilizing both intermediate and final product recycle is superior to the single, final product only recycle process because larger recoveries and separations factors were obtained. Both processes, however, yielded identical adsorbent productivities. As is also set forth in Table III, the results achieved by utilization by these embodiments appear dramatically superior to those achieved both by Knaebel and Pigford in their article *I & EC Fundam.* Vol 22, 336 (1983) and also by Carta and Pigford in their paper presented at AICHE Annual Meeting, Chicago, Ill. (1985). The values in the table indicate that the separation factor, $\alpha$, in both embodiments of the process was dramatically greater than either of the processes set forth in the two articles. The dual recycle process embodiments also exhibited a greater recovery, R, than either of the prior att systems.

TABLE III

Comparison of Thermal Swing Processes

| PROCESS | $C_F$(ppm) | $\alpha$ | R | P |
|---|---|---|---|---|
| Single Recycle | 1000 | 79.1 | 0.15 | 2.45 |
| Dual Recycle | 1000 | 315.8 | 0.79 | 2.45 |
| Knaebel & Pigford | 1750 | 9.3 | 0.67 | 20.3 |
| Carta & Pigford | 1750 | 18.1 | 0.50 | 10,2 |

EXAMPLE 4

In these examples involving desalinization the ratio of the amount of liquid recycle to the amount of net product vary, while the separation factor and fractional solvent recovery are determined, with the results set forth in the accompanying table. The adsorbent productivity is 50 kg (feed)/kg(adsorbent)hr, and it is constant since the feed flow rate is fixed.

TABLE IV

Resin Properties: Sirotherm TR-20

| | | |
|---|---|---|
| $d_p$ = | particle diameter = | 0.92 mm |
| $\rho_s$ = | particle density = | 1.6 g/cm$^3$ |
| $\epsilon_p$ = | intraparticle porosity = | 0.6 |
| $C_{ps}$ = | resin specific heat = | 0.5 cal/g °C. |

Operating Conditions

| | | |
|---|---|---|
| $C_F$ = | feed concentration = | 0.01 mol/l NaCl |
| $T_h$ = | 70° C. | |
| $T_l$ = | 10° C. | |
| $Q_F$ = | 100 cm$^3$/min | |
| R = | recycle flow rate/net purified product flow rate = | variable |

Column Parameters

| | | |
|---|---|---|
| $A_{cs}$ = | Cross Sectional Area = | 3.0 cm$^2$ |
| L = | Column Length = | 100 cm |
| $\epsilon_b$ = | Particle Porosity = | 0.5 |

TABLE V

| Recycle Ratio $Q_R/Q_l$ | Separation Factor $\alpha$ | Solvent Recovery R |
|---|---|---|
| 0 | 29.85 | 0.728 |
| 0.111 | 38.33 | 0.703 |
| 0.250 | 57.23 | 0.680 |
| 0.429 | 119.5 | 0.648 |
| 0.622 | ∞ | 0.617 |

The recycle ratio is the ratio of the flow rate of the recycled stream to that of the net lean product, i.e., analogous to the reflux ratio for distillation.

The preceding examples can be repeated with similar success by substituting the generically or specifically described components and/or operating conditions of this invention for those used in the preceding examples.

EXAMPLE 5

In this example, the employed solute was toluene and the solvent, which contained the solute, was N-heptane with the concentration of toluene being 0.1% of the heptane or, in other words, the liquid feed stream of heptane contained 1000 ppm of toluene. The employed fixed adsorption bed was a packed column, about 242 in. ID by 25 in. length, of +100 to −120 mesh particles of a silica gel, characterized as possessing a marked adsorption affinity for aromatic hydrocarbons in comparison to aliphatic hydrocarbons, such as silica Gel, Grade 12, of Davison Chemical Division of W. R. Grace & Co. The incoming stream flowing into one end of the silica gel column was controlled to maintain a feed stream flow rate averaging about 250 ml/min. During the adsorption half-cycle, the lower or cold temperature (cooled as necessary by cooler 16) of the introduced stream was to about 25° C. During the regeneration half-cycle the elevated or hot temperature (heated as needed by heater unit 10) of the stream was to about 75° C. before stream introduction into the one end of the silica gel column. Effluent streams from the other end of the column arbitrarily were selected that collection of pure solvent product (heptane) was made from the product stream during the adsorption half-cycle when the purified product stream 18 contained less than about 10 ppm of toluene. Measurement at periodic intervals of the presence and amount of toluene in the heptane effluent was by UV spectroscopy. As the silica gel bed became saturated to the extent that the effluent stream approached about 1000 ppm of toluene, then the regeneration half-cycle was initiated with employment of purified product stream of heptane being heated to about 75° and introduced into the one end of the column for the regeneration. As regeneration proceeded the effluent stream provided an enriched product stream of heptane containing as much as or more than 4000 ppm of toluene and as regeneration continued further regeneration was ceased upon the hexane effluent stream approaching a content of about 10 ppm of toluene, so that a new adsorption half-cycle then could be commenced.

Figure 6:
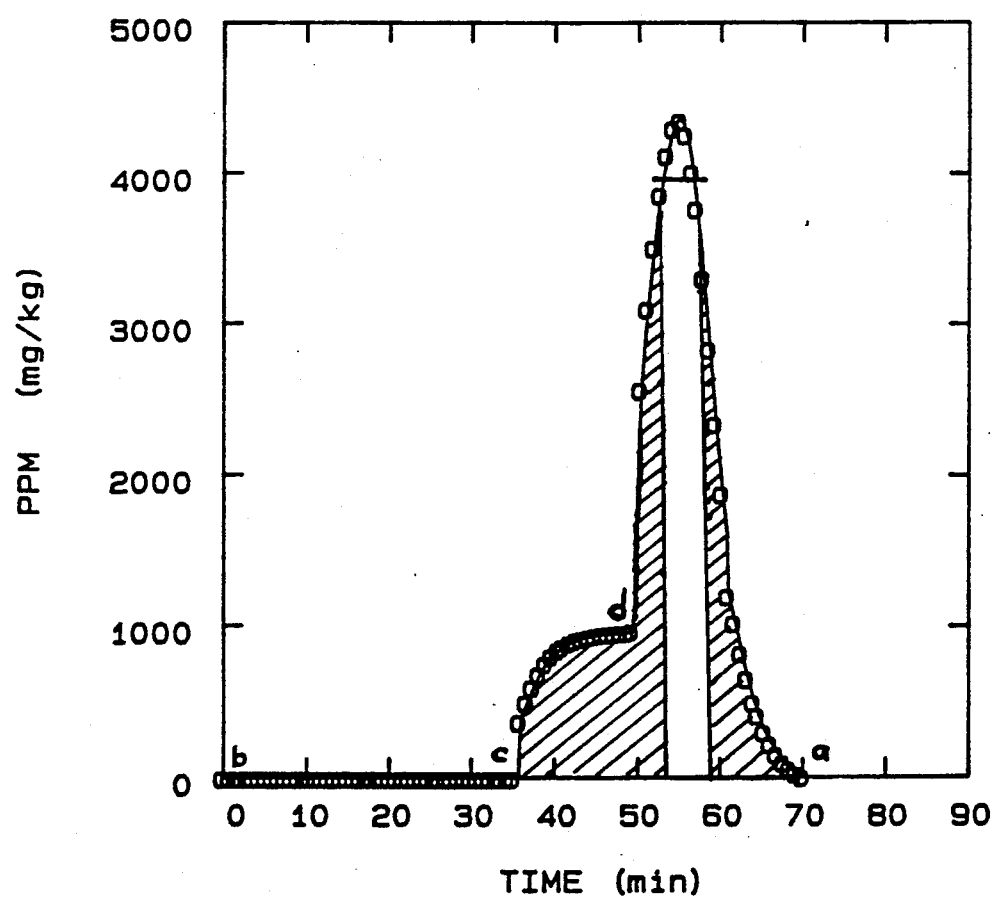
FIG. 6 is a graph of effluent concentration versus time for a complete heating and cooling cycle in practice of another embodiment of the process.

FIG. 6 presents a graph of effluent concentration versus time for one complete cycle of the thermal swing adsorption process illustrated by this example for purification of heptane containing 0.1% of toluene. In FIG. 5, the time interval between points b and c designates the time period during which a purified heptane product stream was recovered; a time interval between points c to d illustrates the period of noticeable saturation of the silica bed as appearing from toluene content of effluent stream; and the time interval between points about d to a presents the time period utilized for a regeneration half-cycle.

In FIG. 6, akin to like hatched and open portions in FIG. 5, hatched portions under the effluent concentration plot illustrate the time periods and enriched product effluent 14, which while effluent containing solute in significant amount, provide that enriched solute product 14 for recycling and passing back, generally first to recycle holding tank 24, to mix with the liquid feed stream for purification in adsorption half-cycle, and, while intermediate the hatched portions under the effluent concentration plot are illustrated a time period elapsed and an open (not hatched) columnar-like-shaped portion for effluent enriched product 14, such open columnar-like-shaped portion represents enriched solute product 14 effluent so highly enriched that it generally is drawn off (not recycled) and utilized for purposes not related to the invention.

In this Example 5 a pure product recovery, R, of about 0.8 was obtained for the N-heptane.

EXAMPLE 6

A substantial repeat of Example 5 was made, except in place of N-heptane containing 1000 ppm of toluene there was employed heptane containing 500 ppm of toluene and 500 ppm of xylene. A plot (not illustrated) of effluent concentration versus a complete heating and cooling cycle was obtained which was similar to that illustrated in FIG. 5, except for the time periods between points b, c, d and a. In this plot purified heptane (i.e. less than about 10 ppm of the toluene-xylene solute) was obtained for about 20 minutes (period between points b and c) with the silica gel bed in about the next 13-14 minutes (period between points c and d) becoming so saturated that effluent approached a total solute content of 1000 ppm and higher During the regeneration half-cycle an effluent enriched product stream containing as much as or more than 4000 ppm of solute results and regeneration is accomplished in about 14 minutes (period between points about d to a) to provide a newly regenerated silica bed for commencement of a new adsorption half-cycle.

From the foregoing description, one skilled in the art can easily ascertain the essential characteristics of this invention, and without departing from the spirit and scope thereof, can make various changes and modifications of the invention to adapt it to various usages and conditions.

I claim:

1. A continuous cyclic thermal swing adsorption process for the regeneration of a fixed adsorption bed and the purification of an incoming feed liquid stream with the utilization of at least one product recycle stream and the incoming feed liquid stream comprising a solvent containing a solute, the process comprising the following steps repeated successively in their below presented sequence:

regenerating a single at least partially saturated fixed adsorption bed by heating and flowing a first feed liquid stream into one end of the single at least partially saturated fixed adsorption bed with the heated first feed liquid stream at a first temperature, the heated first feed liquid stream consisting essentially of a recycled substantially pure, product liquid stream or of a mixture of the recycled substantially pure, product liquid stream and the incoming feed liquid stream, while removing an enriched product liquid stream from the other end of the fixed adsorption bed;

adsorbing solute by subsequently flowing a second feed liquid stream into said one end and through the fixed adsorption bed, which was regenerated in the preceding step, with the second feed stream comprising the incoming feed liquid stream or a mixture of the incoming feed liquid stream and a recycled portion of the enriched product liquid stream, and with the second feed liquid stream at a temperature lower than the first temperature, while removing a substantially pure, product liquid stream from the other end of the fixed adsorption bed; and recycling a portion of the substantially pure, product liquid stream to the first feed liquid stream.

2. A process according to claim 1 wherein a portion of the enriched product liquid stream from the fixed adsorption bed is recycled by flowing to a first storage mean and said first storage means to the second feed stream, which is the mixture of the incoming feed liquid stream and the recycled portion of the enriched product liquid stream.

3. A process according to claim 2 in which the recycled portion of the enriched product liquid stream is of a solute concentration from about 50 to 200% by weight of the solute concentration of the incoming liquid feed stream.

4. A process according to claim 2 wherein the recycling to the first storage means begins when the solute concentration of the enriched product liquid stream reaches a concentration no greater than about the solute concentration of the incoming feed liquid stream.

5. A process according to claim 1 wherein the incoming feed liquid stream comprises a mixture of at least two hydrocarbon liquids.

6. A process according to claim 1 wherein the recycling of the portion of the substantially pure, product liquid stream is by flowing to a second storage means and from the second storage means to the first feed liquid stream.

7. A process according to claim 6 wherein the recycling to the second storage means continues until the solute concentration of the substantially pure, product liquid stream rises to a solute concentration of 75 percent of the feed liquid stream.

8. A process according to claim 1 where the solvent in the incoming feed liquid stream is selected from the group consisting of water, phenolic waste waters, and organic mixtures.

9. A process according to claim 8 wherein the solute is a salt.

10. A process according to claim 1 wherein the fixed adsorption bed is selected from the group consisting of ion exchange resins, polymeric adsorbents, inorganic adsorbents and thermally sensitive gels.

11. A process according to claim 1 wherein the second feed liquid stream is cooled to the temperature lower than the first temperature for the subsequently flowing in the adsorbing step.

12. A process according to claim 1 where in the step of regenerating the removing is of the enriched product liquid stream having a solute concentration from about 200 to 1000% by weight of the solute concentration of the incoming feed liquid stream, and in the step of adsorbing the second feed stream is the incoming feed liquid stream.

13. A process according to claim 1 in which the recycling of the portion of the substantially pure, product liquid stream ranges from about 20 to 90% by weight of the substantially pure, product liquid stream removed from the adsorption bed.

14. A process according to claim 1 wherein the first feed liquid stream is the recycled substantially pure product liquid stream.

15. A process according to claim 14 in which the recycling of the portion of the substantially pure, product liquid stream is from about 20 to 90% of the substantially pure, product liquid stream removed from said other end of the adsorption bed.

16. A process according to claim 1 wherein the process employs for the first feed liquid stream the substantially pure, product liquid stream and for the second feed stream the incoming feed liquid stream.

17. A continuous cyclic thermal swing adsorption process including recycling of at least some product stream and for separation of a feed liquid stream, containing a solvent liquid having at least one solute therein, into a first product stream of substantially pure solvent liquid and a second product stream of solvent liquid enriched in solute, which said process comprises repeating successively the following steps in their below presented sequence:

(a) heating to a first temperature and flowing through one end of a column of a single fixed adsorption bed, which is at least partially saturated with solute, an incoming desorption stream which consists essentially of
   (i) recycled first product stream of substantially pure solvent liquid product, or
   (ii) a mixture of a recycled portion of the first product stream of substantially pure solvent liquid product and of said feed liquid stream, thereby regenerating the single fixed adsorption bed to provide a desorbed single fixed adsorption bed, while removing from the other end of the column the second product stream of solvent liquid enriched in solute;

(b) subsequently cooling to a second temperature lower than the first temperature and flowing a cooled incoming feed stream into said one end of the column of the single fixed adsorption bed with the cooled incoming feed stream consisting essentially of
   (iii) said feed liquid stream, containing the solvent liquid having at least one solute dissolved therein or
   (iv) a mixture of said feed liquid stream, containing the solvent liquid having at least one solute dissolved therein, and of a recycled portion of the second product stream of solvent liquid enriched in solute, said flowing into continuing through said desorbed single fixed adsorption bed in the same direction as in the preceding (a) step of flowing through of the incoming desorption stream, while removing from said other end the first product stream of a substantially pure solvent liquid and leaving said single fixed adsorption bed, which is at least partially saturated with solute.

18. The process of claim 17 which includes the additional steps of:

(a$^1$) recycling a portion of the second product stream of solvent liquid enriched in solute from step (a) in which the solute concentration is from about 50 to 200% by weight of the solute concentration of said feed liquid stream to a second storage means and flowing from said second storage means to said incoming feed stream for said mixture (iv); and (b$^1$) recycling from about 20 to 90% by weight of the first product stream of a substantially pure solvent liquid from step (b) to a first storage means and flowing from said first storage means to said incoming desorption stream.

19. The process of claim 17 in which the feed liquid stream contains water for the solvent liquid and salt for the solute.

20. The process of claim 17 in which the feed liquid stream contains an aliphatic hydrocarbon liquid for the solvent and at least one aromatic liquid for the solute.

* * * * *